Patented Nov. 2, 1937

2,098,111

UNITED STATES PATENT OFFICE 2,098,111

PROCESS FOR TREATMENT OF VEGE-
TABLE FIBER

James S. Sconce, Niagara Falls, N. Y., assignor to Hooker Electrochemical Company, New York, N. Y., a corporation of New York No Drawing. Application May 4, 1935,
Serial No. 19,850

15 Claims. (Cl. 8—2)

More particularly, my process relates to the treatment of crude vegetable fiber, such as wood pulp. One object of my process is to remove dark colored or otherwise objectionable, non-cellulosic constituents from the fiber and to do so with a minimum or no loss of strength in the material, with a view to rendering the same more suitable as a raw material for fibrous products, such as paper.

Another object of my invention is to improve the availability of the material for certain chemical processes, such as manufacture of cellulose esters; cellulose xanthate, etc. More specifically, among the desirable chemical qualities which my process tends to improve are alpha cellulose content, insolubility in alkalis, etc.

My process is of the type involving a chlorination followed by neutralization as by lime, with or without a final bleaching, as by a hypochlorite.

In co-pending application, Serial No. 694,171 (Rue, Patent No. 2,001,268, May 14, 1935) there is disclosed a process by which a light colored pulp may be produced from kraft stock with little or no loss of strength. An essential step in the process referred to is what I call a "forced chlorination"; i. e., a chlorination in which the material is subjected while in aqueous suspension to the action under acid conditions of chlorine in substantial excess of the quantity required for complete chlorination of the non-cellulosic constituents of the pulp. The purpose of this forced chlorination is to minimize the time of chlorination, thus avoiding the degradation of the pulp, such as loss of strength, destruction of cellulose, etc., which otherwise occurs, probably due in part to the effect upon the cellulose of the hydrochloric acid formed during the chlorination.

This forced chlorination depends upon the fact that absorption of chlorine by the pulp is rapid when the chlorine is in high concentration and slow when it is in low concentration. The per cent absorption of the chlorine, in fact, tends to follow a hyperbolic curve, with 100 percent absorption as the asymptote. If, for example, it be desired to react 4 percent, by weight, of chlorine with the pulp and only this quantity of chlorine be added to the pulp, the absorption will be incomplete after the lapse of several hours; but if 8 percent of chlorine be added, the required 4 percent will have been absorbed after only three to five minutes.

The chlorinated non-cellulosic constituents, such as chlorinated lignin, are soluble in alkalis. By adding an alkali, the acids are neutralized and the chlorinated matter taken into solution; and if a caustic alkali, such as lime, is used and is in sufficient amount to combine with the unreacted chorine a hypochlorite is formed and a useful bleaching effect obtained. For this purpose the pH of the suspension should be not less than 8.

The chlorination step may, if desired, be repeated, or, in other words, divided into two shorter steps. By so doing, a whiter and stronger product will result. The pulp may then be subjected to the usual hypochlorite bleaching step.

For a given total of chlorine consumption in the chlorine and bleaching steps, superior results as to strength are obtained if the greater part of the chlorine is used in the chlorination step. On the other hand, lighter color is obtained if the greater part of the chlorine is in the bleaching stage.

In the preliminary treatment of wood fiber intended for the production of pulp of a high degree of whiteness it is usual to "cook" the fiber quite drastically in order to reduce the lignin content to a low figure in this step. This lowers the yield and weakens the pulp. When the process of the above mentioned co-pending application is used this drastic treatment becomes unnecessary and undesirable.

Under-cooked or lightly cooked wood fiber is available for production of strong, tough paper. It is known as "kraft" stock. Such stock when treated by ordinary processes yields a tough, dark brown pulp. When treated by the process of the co-pending application it yields a pulp of a light cream color and having a strength nearly equal to that of the unbleached kraft stock.

The process referred to therefore produces a whiter, stronger pulp from any given stock than previously known processes and if the stock be a lightly cooked or kraft stock it produces a cream white pulp of kraft strength.

One of the factors affecting the strength of the pulp is the percentage of alpha cellulose. High alpha cellulose makes for high insolubility in alkalis and low "copper number", both of which characteristics are conducive to high strength and permanence. These qualities are likewise important for certain chemical purposes, such as production of nitro-cellulose, cellulose acetate and artificial silks. In the production of nitro-cellulose for explosive purposes, where strength of fiber is of no consequence, they are nevertheless important on account of their influence upon yield.

During the World War, Wallace and Stevens developed a process for producing a pulp suitable for nitro-cellulose manufacture, depending upon a chlorination followed by a leaching with caustic soda. The chlorination step, however, was effected in the usual maner, well known to the early art, in which no excess chlorine is used and the chlorination is continued to exhaustion of the chlorine, the process requiring several hours. This resulted in considerable degradation of the pulp. There was no treatment of the pulp with a hypochlorite.

I have discovered that if, after chlorination in accordance with the process of the above mentioned co-pending application, the material be leached with caustic soda, a still whiter pulp may be obtained having the same high strength characteristics. If this step be followed by a hypochlorite bleaching step, a high white pulp may be produced having the strength of kraft pulp, a result which has, to the best of my knowledge and belief, never before been attained.

My process is therefore essentially a refinement of the process of co-pending application Serial No. 694,171 (Rue, Patent No. 2,001,268, May 14, 1935) in which all the effects are heightened. That is to say, with any given raw stock my process will produce a whiter pulp of equal strength or a stronger pulp of equal whiteness; or if the preliminary "cook" of the raw stock be reduced in severity there will be a better yield and my process will produce a pulp that is both whiter and stronger than that of the co-pending application or any other of which I have any present knowledge. At the same time, the pulp produced by my process will have a higher chemical quality; that is to say, it will show a higher alpha cellulose content, and a higher insolubility in alkalis and lower copper number than ordinary commercial pulp.

If lime is used to form the hypochlorite in my process, in the subsequent leaching step, if high alpha cellulose is of secondary importance, I may use as little as one percent of caustic soda. If an alpha cellulose content of over 90 percent is desired, I use over four percent caustic soda. If an extremely high alpha cellulose, such as 98 percent, is desired, I may use as much as 150 percent caustic soda.

The leaching step of my process may be carried out at any temperature between 0° C. and the boiling temperature of the solution.

My process is susceptible of various modifications. Thus if we denote the chlorination step, including the hypochlorite stage, by the letter "C", the leaching step by the letter "L" and the bleaching step by the letter "B", several different combinations of steps have been found useful; thus, The combination C—L or C—C—L produces a light cream colored pulp of high strength.

The combination C—L—B or C—C—L—B produces a high white, high strength pulp.

The combination C—L—C or C—C—L—C produces a pulp generally similar to that of the preceding combination but slightly stronger, less white and of higher chemical quality.

In this case the chlorine used in the second chlorination step would of course be based on the non-cellulosic constituents remaining in the pulp after the previous steps.

In any of these combinations, if lime is used to produce the hypochlorite the caustic soda used for leaching will be less or more than 4 percent, depending upon whether an alpha cellulose content of under or over approximately 90 percent respectively is desired. As high alpha cellulose is obtained at some sacrifice of yield, extremely high alpha cellulose is desirable only where the highest strength is sought.

The pulps produced by any of the above combinations of steps, if intended for use in the manufacture of cellulose esters, may be improved, with respect to their mineral content, by treatment with HF, HCl, $H_2SO_4$, $HNO_3$ or $H_3PO_4$ in concentrations of 0.2 to 2 percent. In this way the mineral content of the pulp may be reduced to less than 0.25 percent. There is no harmful effect upon the pulp when it is to be used for the purposes stated.

A second leaching with caustic soda with a washing step between leachings, gives improved results over those of any of the above processes. Thus we arrive at the following combinations of steps C—L—L, C—C—L—L, C—L—B—L, C—C—L—B—L, C—L—C—L, C—C—L—C—L, etc.

If the second leaching step is employed it is desirable that the fresh caustic soda solution be used in the second stage and reused in the first stage, as the organic compounds leached from the pulp tend to inhibit further extraction.

The leaching step may be used prior to the chlorination step, giving the combination L—C—B, without affecting the color produced by a given consumption of chlorine. However, the strength characteristics of the process are thereby adversely affected. I therefore prefer the process in which leaching follows chlorination.

Example 1 (kraft stock)

A sample of unbleached Western hemlock kraft pulp was found to have the following strength characteristics:

| Ball mill revolutions | Mullen pts. per lb. per ream | Tear grams per lb. per ream | Double fold |
|---|---|---|---|
| 2,400 | .66 | --------- | 200 |
| 4,800 | .94 | 2.61 | 1,000 |
| 7,200 | 1.10 | 2.26 | 1,500 |
| 9,600 | 1.18 | 2.02 | 1,580 |
| 12,000 | 1.23 | 1.86 | 2,200 |

The chemical characteristics were as follows:

| Alpha cellulose percent | Percent insoluble in 7.14% NaOH | Copper number |
|---|---|---|
| 87.6 | 89.3 | 1.4 |

Example 2 (process C—L—B)

343 grams of the same kraft pulp were treated at a consistency of 3 percent with 9.5 percent by weight available chlorine (on the basis of dry weight of the pulp). After 5 minutes there remained 3.3 percent of available chlorine (pulp basis). 39.1 grams of lime were then added and resulting hypochlorite allowed to react with the pulp for 85 minutes. At the end of that time the pulp was washed and 3 percent of NaOH added. The leaching with NaOH was continued for 1 hour. The pulp was then washed again, concentrated to a 5 percent consistency and treated with 1 percent of available chlorine as $Ca(ClO)_2$. This bleaching step was continued for 5 hours and 40 minutes. The total chlorine consumed was 10.2 percent of the pulp by weight.

After this treatment the pulp was found to have a high white color and the following strength characteristics:

| Ball mill revolutions | Mullen pts. per lb. per ream | Tear grams per lb. per ream | Double folds |
|---|---|---|---|
| 2,400 | .83 | 2.49 | 350 |
| 4,800 | 1.01 | 2.63 | 800 |
| 7,200 | 1.19 | 2.42 | 1,200 |
| 9,600 | 1.26 | 2.21 | 2,000 |
| 12,000 | 1.29 | 1.88 | 2,400 |

The chemical characteristics were as follows:

| Alpha cellulose percent | Percent insoluble in 7.14% NaOH | Copper number |
|---|---|---|
| 88.1 | 86.5 | 1.2 |

A comparison of these figures with the corresponding figures for the unbleached kraft in Example 1 shows that all the strength figures were increased with the exception of the double folds at 4,800 and 7,200 ball mill revolutions. This is a remarkable result when it is considered that the color of the pulp was changed during the operation from a dark brown to a milk white.

A comparison of the chemical characteristics naturally shows a slight reduction in alpha cellulose and in alkali insolubility, but at the same time a lower copper number.

*Example 3 (process L—C—B)*

343 grams of the same kraft pulp were leached at 3 percent consistency with 3 percent of NaOH for one hour, washed and treated with 9.5 percent available chlorine. After 5 minutes there remained 3.5 percent available chlorine (pulp basis). 39.1 grams of lime were then added and the hypochlorite reaction continued for 55 minutes. The pulp was washed again and treated with 1 percent of available chlorine as $Ca(ClO)_2$ for the same length of time as in Example 2. The total chlorine consumed was 10.1 percent (pulp basis). The strength characteristics were as follows:

| Ball mill revolutions | Mullen pts. per lb. per ream | Tear grams per lb. per ream | Double folds |
|---|---|---|---|
| 2,400 | .90 | 2.43 | 350 |
| 4,800 | 1.03 | 2.22 | 1,000 |
| 7,200 | 1.13 | 2.01 | 1,300 |
| 9,600 | 1.20 | 1.85 | 1,600 |
| 12,000 | 1.20 | 1.80 | 2,000 |

The chemical characteristics of this pulp were as follows:

| Alpha cellulose percent | Percent insoluble in 7.14% NaOH | Copper number |
|---|---|---|
| 88.0 | 84.1 | 1.5 |

The color was approximately the same as that in Example 2. However, a comparison of the strength figures shows that this pulp was generally inferior to that of Example 2, superior to that of Example 1 in the Mullen test and inferior in the tear and fold tests.

To show that my process is capable of yielding a pulp of extraordinarily high alpha cellulose, the following comparison of examples of processes C—B and C—L—B is given:

*Example 4*

| Process | Percent NaOH in leaching step | Alpha cellulose percent | Percent insoluble in NaOH | Copper number |
|---|---|---|---|---|
| C—B | 0 | 87.5 | 72.1 | 1.9 |
| C—L—B | 2.0 | 91.6 | | |
| C—L—B | 3.0 | 92.4 | | |
| C—L—B | 4.0 | 94.1 | | |
| C—L—B | 5.0 | 96.2 | | |
| C—L—B | 7.0 | 96.1 | | |
| C—L—B | 8.0 | 96.8 | 84.4 | 1.2 |
| C—L—B | 9.0 | 97.8 | | |
| C—L—B | 11.0 | 96.1 | | |

The comparison of the process C—L—B of my invention with the process C—B of the co-pending application, Serial No. 694,171, (Rue, Patent No. 2,001,268, May 14, 1935) is of particular interest, in that it shows a much higher alpha cellulose and percent of insolubility in caustic soda, as well as a lower copper number. At the same time the strength figures are generally higher and the color whiter.

Illustrations of the superiority of my process over that of the co-pending application, and to a still greater extent over that of the prior art, could be multiplied indefinitely, but it is believed that enough have been given to establish the novelty and utility of my invention.

I claim as my invention:

1. The treatment of vegetable fiber pulp which comprises subjecting it while in aqueous suspension to the action of chlorine in amount substantially in excess of that required for complete chlorination of the non-cellulosic constituents of the pulp, allowing the chlorine to react with the pulp to a point substantially short of complete exhaustion of the chlorine, adding lime to the pulp in amount sufficient to neutralize the acids formed, combine with the excess chlorine to form a hypochlorite and produce a pH in the suspension of not less than 8, allowing the hypochlorite to react with the pulp, washing the pulp, leaching the pulp with not less than one per cent of its weight of caustic soda and washing the pulp again.

2. The process of producing bleached wood pulp of over 90 percent alpha cellulose and relatively high strength which comprises subjecting kraft stock while in aqueous suspension to the action of chlorine in amount substantially in excess of that required for complete chlorination of the non-cellulosic constituents of the pulp, allowing the chlorine to react with the pulp to a point substantially short of complete exhaustion of the chlorine, adding lime to the pulp in amount sufficient in neutralize the acids formed, combine with the unconsumed chlorine to form hypochlorite and produce a pH in the suspension of not less than 8, allowing the hypochlorite to react with the pulp, adding caustic soda to the pulp in excess of four percent by weight of the pulp, allowing the caustic soda to leach the pulp and washing the pulp.

3. The process for improving the whiteness, tearing strength and alpha cellulose content of brown wood pulp which comprises subjecting the pulp in aqueous suspension to a forced chlorination under acid conditions with chlorine in substantial excess of the quantity required for complete chlorination of the non-cellulosic constituents of the pulp, followed, substantially before complete exhaustion of the chlorine, by neutralization with lime in amount sufficient to combine with the unreacted chlorine to form calcium hypochlorite at a pH of not less than 8, a period of oxidation of the pulp by said hypochlorite and a washing; and also subjecting the pulp to a leaching with not less than 1 percent of its weight of caustic soda, followed by a washing.

4. The process for improving the whiteness, tearing strength and alpha cellulose content of brown wood pulp which comprises subjecting the pulp while in aqueous suspension successively to a leaching with not less than 1 percent of its weight of caustic soda, a washing, a forced chlorination under acid conditions with chlorine in substantial excess of the amount required for complete chlorination of the non-cellulosic constituents of the pulp, neutralization susbtantially before complete exhaustion of the chlorine with lime in amount sufficient to combine with the unreacted chlorine to form calcium hypochlorite with a pH of not less than 8, a period of oxidation of the pulp with said hypochlorite and a second washing.

5. The process for improving the whiteness, tearing strength and alpha cellulose content of brown wood pulp which comprises subjecting it in aqueous suspension to a forced chlorination under acid conditions with chlorine in amount 25 to 100 percent in excess of that required for complete chlorination of the non-cellulose constitutents of the pulp allowing the chlorine to react with the pulp to a point substantially short of complete exhaustion of the chlorine, adding lime to the pulp in amount sufficient to combine with the unreacted chlorine to form calcium hypochlorite at a pH of not less than 8, allowing said hypochlorite to react with the pulp to substantial exhaustion of its oxidizing power, washing the pulp, leaching the pulp with not less than 1 percent of its weight of caustic soda and washing the pulp again.

6. The process for improving the whiteness, tearing strength and alpha cellulose content of brown wood pulp which comprises subjecting it in aqueous suspension to a forced chlorination under acid conditions with chlorine in amount 25 to 100 percent in excess of that required for complete chlorination of the non-cellulosic constituents of the pulp, allowing the chlorine to react with the pulp 3 to 5 minutes, adding lime to the pulp in amount sufficient to combine with the excess chlorine to form calcium hypochlorite at a pH of not less than 8, allowing said hypochlorite to react with the pulp to substantial exhaustion of its oxidizing power, washing the pulp, leaching the pulp with not less than 1 percent of its weight of caustic soda and washing the pulp again.

7. The process for improving the whiteness, tearing strength and alpha cellulose content of brown wood pulp which comprises subjecting it in aqueous suspension to a forced chlorination under acid conditions with chlorine in amount 25 to 100 percent in excess of that required for complete chlorination of the non-cellulosic constituents of the pulp, allowing the chlorine to react with the pulp until 20 to 50 percent of the chlorine remains unreacted, adding lime to the pulp in amount sufficient to combine with the unreacted chlorine and form calcium hypochlorite at a pH of not less than 8, allowing said hypochlorite to react with the pulp to substantial exhaustion of its oxidizing power, washing the pulp, leaching the pulp with not less than 1 percent of its weight of caustic soda and washing the pulp again.

8. The process as claimed in claim 3 followed by a second oxidation with calcium hypochlorite and a final washing, to produce a pulp of high white color.

9. The process as claimed in claim 4 followed by a second oxidation with calcium hypophlorite and a final washing to produce a high white color.

10. The process as claimed in claim 5 followed by a second oxidation with calcium hypochlorite and a final washing to produce a high white color.

11. The process as claimed in claim 6 followed by a second oxidation with calcium hypochlorite and a final washing to produce a high white color.

12. The process as claimed in claim 7 followed by a second oxidation with calcium hypochlorite and a final washing to produce a high white color.

13. The process as claimed in claim 3 in which the pulp is boiled with the caustic soda solution.

14. The process as claimed in claim 3 in which the caustic soda is in the proportion of substantially 4 percent by weight of the pulp, dry basis.

15. The process for improving the whiteness, tearing strength and alpha cellulose content of brown wood pulp which comprises subjecting it in aqueous suspension to the added effects of the steps one of which consists in a forced or drastic acid chlorination for a relatively brief period, with a large excess of chlorine for the purpose of chlorinating certain non-cellulosic constituents of the pulp without appreciably affecting the cellulose, followed by an alkaline oxidation with lime at a pH of 8 or more, making use of said excess chlorine to liberate oxygen for the purpose of oxidizing certain non-cellulosic constituents of the pulp, followed by a washing to remove the constituents of the pulp rendered soluble by said chlorination and said oxidation and the other of which steps consists in a thorough and effective leaching of the pulp with caustic soda, followed by a washing to remove the cellulosic constituents of the pulp which are soluble in caustic soda and which are inferior to alpha cellulose in respect of mechanical strength.

JAMES S. SCONCE.